UNITED STATES PATENT OFFICE.

KARL DIETERICH, OF HELFENBERG, GERMANY.

PROCESS OF MAKING STABLE NON-ALCOHOLIC IRON COMPOUNDS.

No. 809,101.   Specification of Letters Patent.   Patented Jan. 2, 1906.

Application filed October 15, 1904. Serial No. 228,624.

*To all whom it may concern:*

Be it known that I, KARL DIETERICH, a subject of the Emperor of Germany, residing at Helfenberg, near Dresden, Germany, have invented certain new and useful Improvements in Processes for the Production of a Stable Non-Alcoholic Solution of Organic Iron and Organic Iron and Manganese Compounds, of which the following is a specification, such as will enable others skilled in the art to which it appertains to make and use the same.

It is well known that the combinations of iron and manganese or iron manganese with albumen and peptone are very valuable medicines for administering in cases of chlorosis, anemia, and the like; but there is the disadvantage in these preparations that in order to prevent the decomposition of the solutions of these organic iron combinations a large quantity of alcohol must be added. Independent of the fact that the addition of alcohol is prejudicial to the medicine the cost of the medicine is considerably increased, and the medicine prepared with alcohol appears to be of less value when administered to children, (the addition of the alcohol imparting more or less the properties of a cordial to the medicine,) because there is a constantly-growing aversion among medical practitioners against alcoholic medicines. By means of the present invention it is possible to produce without the addition of alcohol iron peptone and iron-manganese peptone solutions which can be preserved for any length of time. These solutions, although no alcohol is added, do not decompose, or at least separate or split up with great difficulty. Irrespective of the more valuable medicinal properties of this combination, more especially when administered to children, owing to the absence of alcohol the value of this combination lies in the fact that the cost is considerably reduced at the same time that the stability of the solution is in no way impaired.

In this invention the unstable combination of iron peptones, iron-manganese peptones, or compounds thereof with carbonic acid is obtained by dissolving the organic iron peptone or iron-manganese peptone and slightly acidifying the same with hydrochloric acid. This solution is then cooled to $0°$ centigrade and impregnated with carbonic acid under a pressure of six atmospheres. This solution is then placed in closed airtight bottles and stored in a cold place for two to three months, whereby a gradual unstable combination of carbonic acid takes place in a somewhat similar manner as with champagne. This solution thus prepared decomposes with much greater difficulty than when the solution is prepared in the ordinary way with the addition of alcohol, as owing to the unstable union a sufficient quantity of carbonic acid is set free, more especially when the solution is moved or shaken in any way to bring into action the antioxidizing properties belonging to carbonic acid. Even when the bottle is opened there is always carbonic acid present in place of air, thereby preventing any decomposition taking place. These solutions possess most valuable medicinal properties, owing to the absence of alcohol in the same. They are considerably cheaper, and owing to the presence of the unstable carbonic-acid combination they are more quickly absorbed into the system. There is a great difference between a solution containing free carbonic acid in large quantities and, as in the present invention, an unstable combination of the carbonic acid, which greatly increases the medicinal value of the preparation.

The iron peptone and iron maganese peptone solutions are prepared from the commercial dry preparations of ferrum peptonatum and ferromanganese peptonatum.

Having thus described my invention, what I claim is—

1. The herein-described process of producing stable non-alcoholic organic iron compounds and organic iron-manganese compounds of the character described, which consists in dissolving in distilled water an unstable organic iron compound and acidifying the same with hydrochloric acid, then cooling this acidulated solution to $0°$ centigrade, then forcing into it carbonic acid under a pressure of about six atmospheres and keeping it under such pressure for a time approximating two to three months.

2. The herein-described process of producing stable non-alcoholic iron compounds and organic iron-maganese compounds of the kind described, which consists in dissolving in water an unstable organic iron compound, then cooling this solution to 0° centigrade, then forcing into it carbonic acid under a heavy pressure, and keeping it under such pressure for a considerable space of time.

In testimony whereof I affix my signature.

KARL DIETERICH.

In presence of—
　HANS DIETERICH,
　CHEMNITZ H. SCHILLING.